(12) United States Patent
Robinson

(10) Patent No.: US 6,279,600 B1
(45) Date of Patent: *Aug. 28, 2001

(54) METHOD FOR SECURING A VALVE CAP

(76) Inventor: Robert Robinson, 317 Ginger Ct., San Ramon, CA (US) 94583

( * ) Notice: Subject to any disclaimer, the term of this patent is extended or adjusted under 35 U.S.C. 154(b) by 0 days.

This patent is subject to a terminal disclaimer.

(21) Appl. No.: 09/638,425

(22) Filed: Aug. 14, 2000

Related U.S. Application Data

(62) Division of application No. 09/151,186, filed on Sep. 10, 1998, now Pat. No. 6,102,064.

(51) Int. Cl.$^7$ .............................. F16B 37/14; F16L 55/115
(52) U.S. Cl. ........................................... 137/232; 138/89.3
(58) Field of Search .......................... 137/232; 138/89.3, 138/89.1, 89.2, 89.4; 251/901

(56) References Cited

U.S. PATENT DOCUMENTS

| | | | | |
|---|---|---|---|---|
| 596,220 | * | 12/1897 | Smith ............................. | 251/901 X |
| 2,179,045 | * | 11/1939 | Lewis ............................. | 138/93.8 X |
| 2,453,001 | * | 11/1948 | De Stefano ..................... | 138/89.1 |
| 2,774,385 | * | 12/1956 | Rabaseda ....................... | 138/89.3 |
| 3,923,183 | * | 12/1975 | Choksi et al. .................. | 215/251 |
| 4,166,552 | * | 9/1979 | Faulstich ....................... | 215/256 |
| 4,688,703 | * | 8/1987 | Bayer ............................. | 222/541.8 |
| 4,732,289 | * | 3/1988 | Granat et al. .................. | 215/252 |
| 5,630,687 | * | 5/1997 | Robinson ....................... | 411/372 |
| 5,642,825 | * | 7/1997 | Wohlgemuth ................. | 215/256 |
| 5,819,969 | * | 10/1998 | Kalodye ......................... | 215/251 |
| 6,102,064 | * | 8/2000 | Robinson ....................... | 137/232 |

* cited by examiner

*Primary Examiner*—Michael Powell Buiz
*Assistant Examiner*—Meredith H. Schoenfeld
(74) *Attorney, Agent, or Firm*—Kenneth C. Brooks

(57) ABSTRACT

A theft resistant valve cap including a liner adapted for threaded engagement with a standard pneumatic tire stem valve, a sleeve rotatably mounted with the liner to shroud it and an interlocking feature to selectively prevent axial displacement between the liner and the sleeve. The interlocking feature includes a screw threaded into an aperture in the sleeve, or other coupling device, and an annular channel on the liner, positioned to receive the screw. The annular channel has an upper surface, a lower surface and an inner surface disposed between the upper and lower surfaces. The screw is moved so that it extends into the channel resting proximate to the upper surface, but clear of both said lower and inner surfaces. The screw can be removed after the valve cap has been installed. In this fashion, the liner and the sleeve are in a fixed axial position with respect to each other; however, the rotatability of the sleeve with respect to the liner is maintained, preventing removal of the liner from the stem. The rotational movement of the sleeve prevents removing the liner and/or the sleeve from the valve stem.

20 Claims, 4 Drawing Sheets

METHOD FOR SECURING A VALVE CAP

This application is a Divisional of Ser. No. 09/151,186 filed Sep. 10, 1998, U.S. Pat. No. 6,102,064.

TECHNICAL FIELD

The present invention pertains to the field of pneumatic valves. Specifically, the present invention pertains to an improved cap for use with a standard pneumatic tire stem valve.

BACKGROUND OF THE INVENTION

Valve caps for standard pneumatic tire valves have traditionally been employed to protect the valve stem from degrading due to corrosion caused by exposure to the environment. The traditional valve caps were typically manufactured from inexpensive polymer-based materials. As such, they were relatively inexpensive and weren't aesthetically appealing. A drawback with the traditional valve cap is that they were easily removed allowing access to the valve actuating member of the valve stem so air could be released from the tire by unauthorized persons.

In recent years, designer caps have come into existence. One such cap is described in U.S. Pat. No. Des. 306,420. The designer caps are aesthetically appealing to the average person and are much more expensive than the traditional valve caps. Typically, a single designer valve cap can cost several dollars. A major drawback with the designer caps is that they are easily removed from the valve stem. Similar to the traditional valve caps, this allows unauthorized person to release air from the tire. More significant, however, it that easy removal raises the possibility that the cap would be stolen, due to its aesthetic appeal. This is a major factor in dissuading purchasers from investing in designer caps. To reduce the probability of unauthorized removal, tamper resistant valve caps have been developed.

U.S. Pat. No. 5,630,687 discloses a prior art tamper resistant valve cap that includes a liner adapted for threaded engagement with a standard pneumatic tire stem valve, a sleeve rotatably mounted with the liner to shroud it and an interlocking feature to selectively prevent axial displacement between the liner and the sleeve. The interlocking feature includes a screw threaded into an aperture in the sleeve, and an annular channel on the liner, positioned to receive the screw. The annular channel has an upper surface, a lower surface and an inner surface disposed between the upper and lower surfaces. The screw is moved so that it extends into the channel resting proximate to the upper surface, but clear of both said lower and inner surfaces. In this fashion, the liner and the sleeve are in a fixed axial position with respect to each other; however, the rotatability of the sleeve with respect to the liner is maintained, preventing removal of the liner from the stem. The rotational movement of the sleeve prevents removing the liner and/or the sleeve from the valve stem. While this valve cap provided superior protection against unauthorized removal of the same, it was subject to damage due to cross-threading of the liner onto the valve stem.

What is needed, therefore, is a theft resistant valve cap which has a reduced probability of cross-threading during operation.

SUMMARY OF THE INVENTION

A valve cap includes a liner adapted for threaded engagement with a standard pneumatic tire valve stem, a sleeve rotatably mounted with the liner to shroud it and an interlocking feature to selectively prevent rotational displacement between the liner and the sleeve. The liner includes upper and lower portions with the upper portion including a circular disc supported above the lower portion by a shaft. Formed into the circular disc are one or more recesses to facilitate deformation of the circular disc. Typically, both the shaft and the lower portion are cylindrical. The diameter of the shaft is much smaller than the diameter of either the upper and lower portions, defining an annular channel. The annular channel has an upper surface, a lower surface and an inner surface disposed between the upper and lower surfaces. The interlocking feature includes a screw threaded into an aperture in the sleeve, and an annular channel on the liner, positioned to receive the screw. The sleeve has an inner surface defining a profile complementary to the profile of the liner. To that end, the interior surface of the sleeve includes an annular projection disposed proximate to a closed end, defining a bulwark. The bulwark is spaced apart from the closed end, defining two spaced apart chambers with a throughway extending therebetween. One of the chambers, disposed proximate to the closed end is adapted to receive the circular disc. The throughway, however, has a diameter which is slightly smaller than the diameter of the circular disc. In this manner, the liner and the sleeve are in snapping-engagement. The interference fit between the bulwark and the circular disc limits the axial displacement between the sleeve and the liner while maintaining rotational movement therebetween, thereby preventing removal of the liner from the stem. To remove the liner, and, therefore, the sleeve from the valve stem, the rotational position of the sleeve with respect to the liner is fixed. This is achieved by moving the screw so that it extends into the channel and rests against the inner surface.

DETAILED DESCRIPTION OF THE PREFERRED EMBODIMENTS

Figure 1:
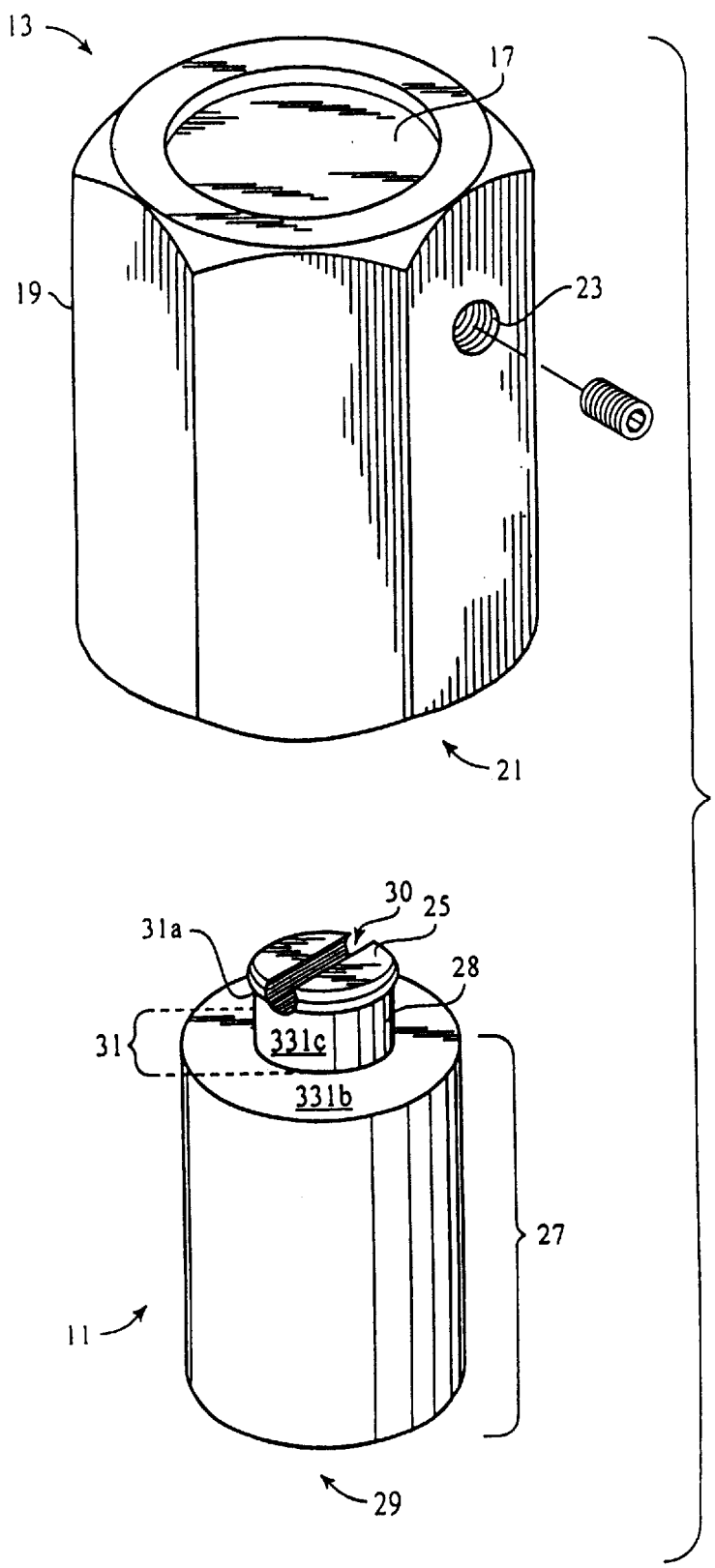
FIG. 1 shows an exploded view of the present invention in accord with the preferred embodiment.
Figure 2:
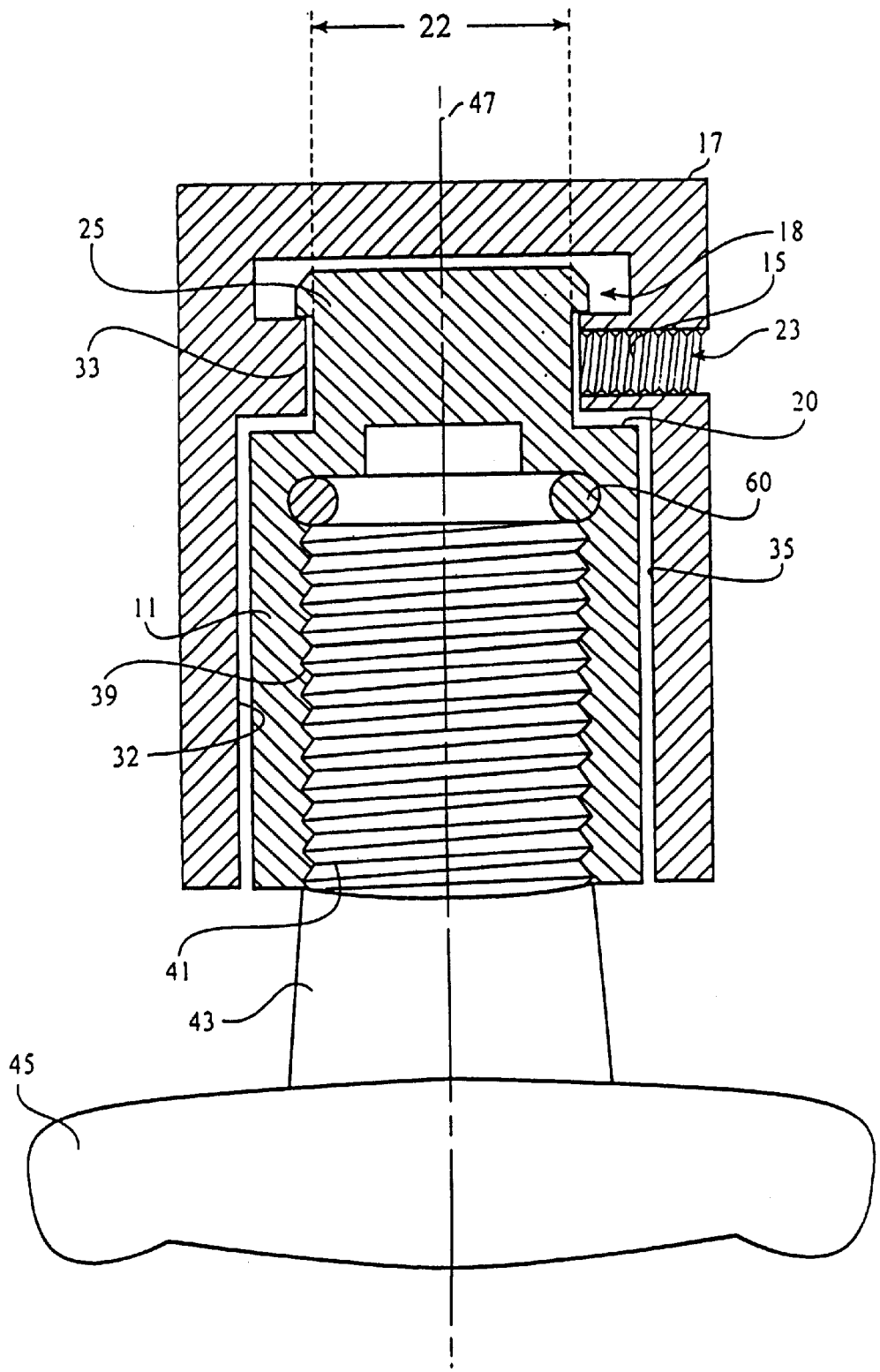
FIG. 2 shows the invention of FIG. 1 mounted onto a pneumatic valve stem of a standard automobile tire.

With reference to both FIGS. 1 and 2, the present invention is shown as including a hollow liner 11, a hollow sleeve 13 and a reciprocating member 15, such as a screw. The liner 11 includes an upper portion 25, a lower portion 27. The upper portion 25 is disc-shaped and supported above the lower portion 27 by a shaft 28. The upper portion 25, lower portion 27 and the shaft 28 define an annular channel 31 having upper 31a and lower 31b surfaces, as well as an inner surface 31c extending therebetween. The lower portion 27 extends from the lower surface 31b, terminating in an orifice 29. Formed into the circular disc are one or more recesses 30, discussed more fully below.

The sleeve 13 has a closed end 17 and a sidewall 19 extending therefrom terminating in an opening 21, as well as an interior surface 32. The interior surface 32 has a profile complementary to the profile of the liner 11. To that end, the interior surface 32 of the sleeve 13 includes an annular projection disposed proximate to the closed end 17, defining a bulwark 33. The bulwark 33 is spaced apart from the closed end 17, defining a cavity 35 having a varying diameter. The cavity includes two spaced-apart chambers 18 and 20 with a throughway 22 extending therebetween. The diameter of the throughway 22 is smaller than the diameter of the chambers 18 and 20. A threaded aperture 23 is formed into the sleeve 13 to receive the reciprocating member 15. Preferably, the aperture 23 is formed into the portion of the sidewall 19 proximate to the bulwark 33. This provides a stronger and more durable area in which to support the reciprocating member 15, while minimizing the materials necessary to construct the sleeve 13.

The opening 21 is shaped so that the liner 11 may pass therethrough and the disc 25 may be disposed within one of the chambers 18 disposed proximate to the closed end 17. Preferably, the throughway 22 has a diameter which is slightly smaller than the diameter of the circular disc 25. In this manner, the liner 11 and the sleeve 13 are in snapping-engagement upon the disc 25 being disposed within the chamber 18. The chamber typically has a diameter slightly larger than the disc 25. This allows limiting the axial displacement of the sleeve 13, with respect to the liner 11, while maintaining rotational movement therebetween. In this configuration, the closed end 17 of the sleeve 13 covers the upper portion 25 of the liner 11, and the sidewall 19 extends so as to completely cover the lower portion 27. The sidewall 19 may be longer or shorter than lower portion 27. However, it is preferred that the sidewall 19 be coextensive with the lower portion 27.

The liner 11 includes a plurality of inner threads 39 positioned to be complementary to the threads 41 of a stem 43 of a pneumatic valve for a standard automobile tire 45. In a final resting position upon the stem 43, the liner 11 provides the same advantages as a traditional valve cap. The sleeve 13 fits over the liner 11 and, with the aforementioned snapping engagement freely rotates about axis 47 when the reciprocating member 15 does not engage the liner 11 to couple the liner 11 to the sleeve 13. This reduces the probability of unauthorized removal from the valve stem 43.

The facilitates removal of the liner 11 and sleeve 13 from the stem 43 by movement transverse to axis 47. Specifically, the reciprocating member 15 facilitates removal of the liner and, therefore the sleeve 13, from the stem 43 when the reciprocating member 15 wedges against the inner surface 31c. In this manner, the angular position of the sleeve 13 with respect to the liner 11 is fixed, thereby allowing the liner 11 and the sleeve 13 to move as a single unit. Moving the sleeve 13 and the liner 11 as a single unit avoids separation of the liner 11 from the sleeve 13 after the assembly has been removed from the stem 43. In the retracted position, the reciprocating member 15 is spaced-apart from the inner surface 31c allowing rotational movement of the sleeve 13 about axis 47. It is preferred that the reciprocating member 15 not protrude from the outside surface when spaced-apart from the inner surface 31c to prevent unauthorized removal of the same. Alternatively, the reciprocating member may be removed from the valve cap entirely after the valve cap has been installed on the valve stem. For example, the reciprocating member can be a screw with a knurled knob, thus allowing the reciprocating member to be tightened against the inner surface for installation or removal of the valve cap by use of the fingers, not needing an additional tool, such as an Allen key or wrench. A single reciprocating member could then be used to install or remove all valve caps in a set (e.g. all 4 on a car).

Typically, the liner 11 is manufactured from an inexpensive and soft polymer-based compound and protects the stem 43 from environmental hazards and may include a rubber O-ring 60, to that end. Specifically, the liner 11 was typically formed from polyurethane or other soft compound which provided the flexibility required to couple to the sleeve 13. However, a problem was encountered in that the inner threads 39 of the liner 11 were easily damaged due to cross-threading of the same when being attached to a valve stem 43. To avoid the aforementioned cross-threading, the liner 11 is manufactured from a harder material such as a compound of acrylonitrile butadiene and styrene, commonly referred to as ABS, an acetal resin, such as the type manufactured by DuPont™ under the trade name DELRIN™, or other suitable material.

Figure 3:
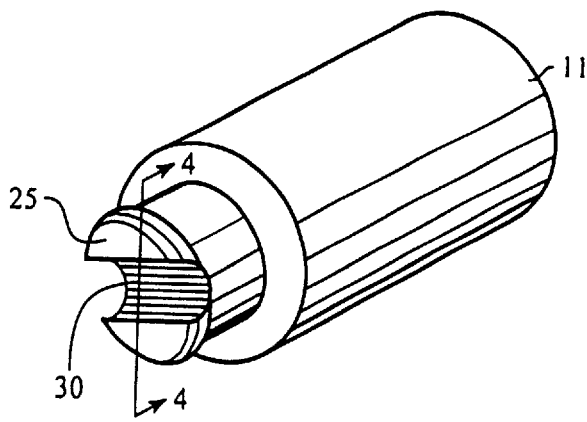
FIG. 3 is a perspective view of the threaded liner shown in FIGS. 1 and 2 in accord with the present invention.
Figure 4:
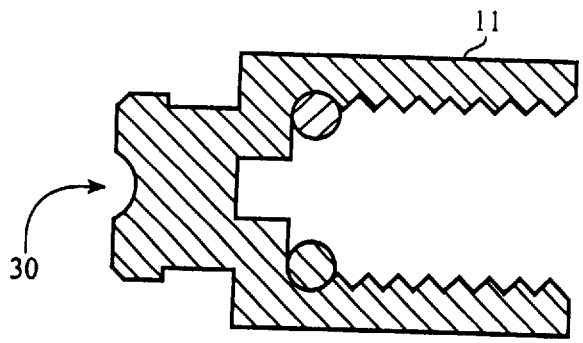
FIG. 4 is a cross sectional view of the liner shown above in FIG. 3, taken along lines 4—4.

Referring to FIGS. 2, 3 and 4, difficulties arose when changing the material from which the liner 11 was formed. More specifically, the disc 25 would shear when passing through throughway 22. This would render the liner 11 inoperable. To avoid the shearing problem, a recess 30 was formed into the upper surface of the disc 25. To provide the disc 25 with the flexibility necessary to allow the same to deform sufficiently so as to pass through the throughway 22 and expand to the original shape upon entering chamber 18, the recess 30 is formed therein. The recess 30 has an arcuate shape and extends across a diameter of the disc 25, but could have a different shape, such as a square notch or dovetail.

Figure 5:
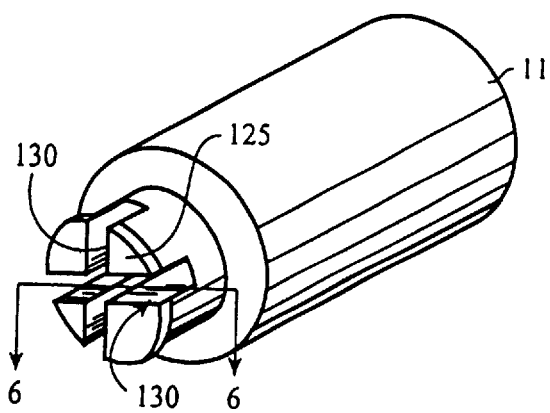
FIG. 5 is a perspective view of the threaded liner shown in FIGS. 1 and 2 in accord with an alternate embodiment of the present invention.
Figure 6:
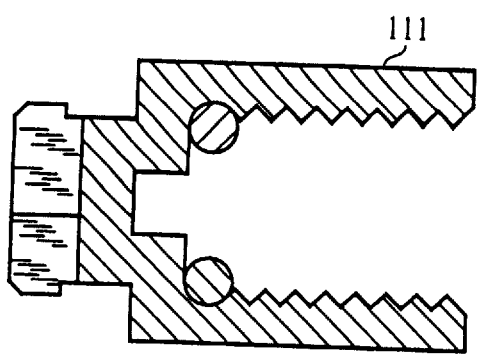
FIG. 6 is a cross sectional view of the liner shown above in FIG. 5, taken along lines 6—6.
Figure 7:
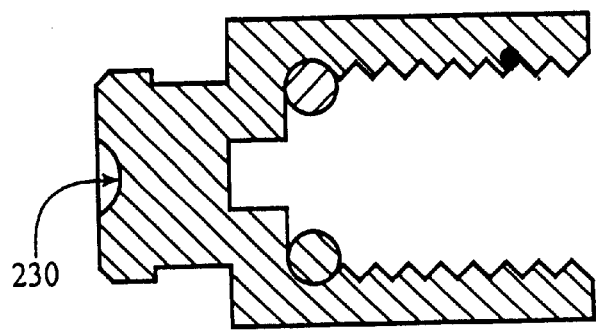
FIG. 7 is a cross sectional view of a liner shown above in FIGS. 1 and 2 in accord with a second alternate embodiment.

Referring to FIGS. 5 and 6, in another embodiment, a pair of intersecting channels 130 are formed into the disc 125 of the liner 111. The channels 130 extend across a diameter of the disc transversely to one another. Although it is not necessary, the periphery 125a of the disc 125 may be tapered to facilitate insertion of the same in to chamber 18. Finally, the disc 225 may be provided with flexibility by manufacturing the same with a void 230 therein, shown in FIG. 7.

Figure 8:
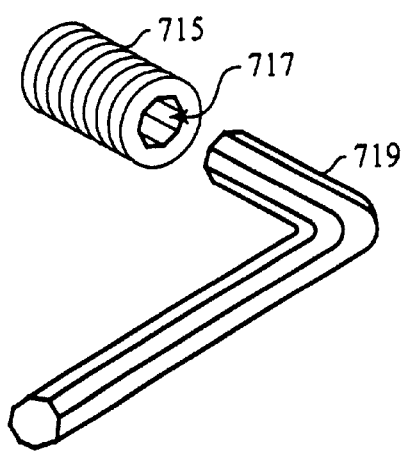
FIGS. 8 and 9 show alternate embodiments of a key and locked used in accord with the present invention.
Figure 9:
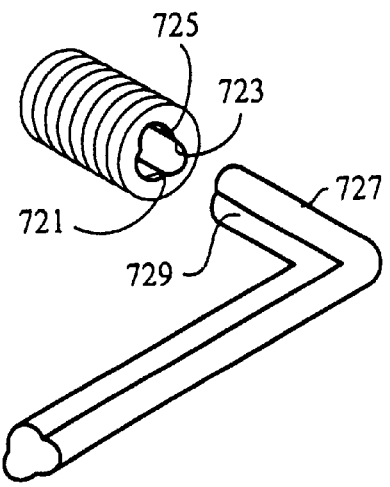

FIG. 8 shows a detailed view of a reciprocating member 715 having a cavity 717 typically configured to fit an Allen wrench 719. It is preferred to utilize this configuration in the present invention to reduce costs. Nonetheless, added security may be provided by having keyed-cavity, shown in FIG. 9. The cavity includes a plurality of sides 721 which are arbitrarily arranged. The sides may be either flat 723 or round 725. The reciprocating member is turned via a key 727. The key 727 has sides 729 that have a shape complimentary to the shape of the sides 721 of the cavity. In this manner, the reciprocating member may be uniquely associated with a key member, further reducing the possibility that the sleeve and liner may be removed for the tire valve-stem.

What is claimed is:

1. A method for securing a valve cap of the type having an internally threaded liner and a sleeve, said method comprising:

covering said liner with said sleeve, with said liner extending from a first end, along a longitudinal axis, terminating in a second end, disposed opposite to said first end;

deforming one of said first and second ends to form an interference fit between said liner and said sleeve.

2. The method as recited in claim 1 further including selectively limiting longitudinal movement between said liner and said sleeve.

3. The method as recited in claim 1 wherein said one of said first and second ends defines a top portion having opposed regions, with deforming one of said first and second ends including moving said opposed regions in opposite directions.

4. The method as recited in claim 1 wherein said first end has a cross-sectional area associated therewith and includes a recess, defining a plurality of flexible regions, with deforming one of said first and second ends further includes moving said plurality of flexible regions to reduce said cross-sectional area.

5. The method as recited in claim 1 wherein said one of said first and second ends has a cross-sectional area associated therewith and includes a plurality of recesses formed therein, defining a plurality of flexible regions, with deforming one of said first and second ends further includes moving said plurality of flexible regions to reduce said cross-sectional area.

6. The method as recited in claim 1 wherein said sleeve includes first and second chambers, with a throughway extending therebetween, with a cross-section of said throughway being less than a cross-section of said first and second chambers, with deforming one of said first and second ends further includes reducing a cross-sectional area of said first end to pass through said throughway so as to be disposed within one of said first and second chambers, forming an interference fit therewith.

7. The method as recited in claim 1 further including selectively limiting rotational movement between said liner and said sleeve by reciprocating a member between said liner and said sleeve.

8. The method as recited in claim 1 wherein said liner includes an outer surface defining an annular channel and further including selectively limiting rotational movement between said liner and said sleeve by reciprocating a member to selectively extend between said sleeve and said annular channel.

9. A method for securing a valve cap of the type having an internally threaded liner with flexible regions disposed at a first end thereof, and a sleeve, said method comprising:

covering said liner with said sleeve, with said liner extending from said first end, along a longitudinal axis, terminating in a second end, disposed opposite to said first end;

deforming said first end by moving said flexible regions to form an interference fit between said liner and said sleeve; and selectively limiting movement between said liner and said sleeve while maintaining rotational movement therebetween.

10. The method as recited in claim 9 wherein deforming said first end further includes moving said flexible regions in opposite directions to reduce a cross-sectional area associated with said first end.

11. The method as recited in claim 9 wherein said sleeve includes first and second chambers, with a throughway extending therebetween, with a cross-section of said throughway being less than a cross-section of said first and second chambers, with deforming said first further includes reducing a cross-sectional area of said first end to pass through said throughway so as to be disposed within one of said first and second chambers, forming an interference fit therewith.

12. The method as recited in claim 9 further including selectively limiting rotational movement between said liner and said sleeve.

13. The method as recited in claim 9 further including selectively limiting rotational movement between said liner and said sleeve by reciprocating a member between said liner and said sleeve.

14. The method as recited in claim 9 wherein said liner includes an outer surface defining an annular channel and further including selectively limiting rotational movement between said liner and said sleeve by reciprocating a member to selectively extend between said sleeve and said annular channel.

15. The method for securing a valve cap of the type having an internally threaded liner having flexible regions disposed at a first end thereof, and a sleeve, said method comprising:

covering said liner with said sleeve, with said liner extending from said first end, along a longitudinal axis, terminating in a second end, disposed opposite to said first end;

deforming said first end by moving said flexible regions to form an interference fit between said liner and said sleeve;

selectively limiting longitudinal movement between said liner and said sleeve; and selectively limiting rotational movement between said liner and said sleeve.

16. The method as recited in claim 15 wherein deforming said first end further includes moving said flexible regions in opposite directions to reduce a cross-sectional area associated with said first end.

17. The method as recited in claim 16 wherein said sleeve includes first and second chambers, with a throughway extending therebetween, with a cross-section of said throughway being less than a cross-section of said first and second chambers, with deforming said first further includes reducing a cross-sectional area of said first end to pass through said throughway so as to be disposed within one of said first and second chambers, forming an interference fit therewith.

18. The method as recited in claim 17 wherein selectively limiting rotational movement between said liner and said sleeve further includes reciprocating a member between said liner and said sleeve to extend therebetween.

19. The method as recited in claim 17 wherein said liner includes an outer surface defining an annular channel wherein selectively limiting rotational movement between said liner further includes reciprocating a member to selectively extend between said sleeve and said annular channel.

20. The method as recited in claim 18 wherein said member is hollow having an interior side and further including shaping said sides, defining a keyed structure.

* * * * *